(12) United States Patent
Brett et al.

(10) Patent No.: US 8,126,249 B2
(45) Date of Patent: Feb. 28, 2012

(54) METHODS OF AND SYSTEM FOR DETECTION AND TRACKING OF OSTEOPOROSIS

(75) Inventors: Alan Brett, Manchester (GB); Jane Haslam, Bucks (GB); Curtis Hayes, Midlothian, VA (US); Joel Krasnow, Wyckoff, NJ (US); Cornelis Van Kuijk, Baarn (NL); Colin Miller, Churchville, PA (US)

(73) Assignee: Optasia Medical Limited, Cheadle (GB)

( * ) Notice: Subject to any disclaimer, the term of this patent is extended or adjusted under 35 U.S.C. 154(b) by 509 days.

(21) Appl. No.: 12/369,324

(22) Filed: Feb. 11, 2009

(65) Prior Publication Data

US 2009/0297012 A1     Dec. 3, 2009

Related U.S. Application Data

(60) Provisional application No. 61/057,369, filed on May 30, 2008.

(51) Int. Cl.
*G06K 9/00* (2006.01)
*G06G 7/48* (2006.01)

(52) U.S. Cl. ........ 382/132; 382/282; 382/286; 600/425; 600/594

(58) Field of Classification Search .......... 382/128, 382/131, 132, 266, 282, 286; 600/407, 425–427, 600/594; 703/11
See application file for complete search history.

(56) References Cited

U.S. PATENT DOCUMENTS

| 7,027,650 | B2 | 4/2006 | Williame et al. |
| 2003/0053673 | A1 | 3/2003 | Dewaele |
| 2003/0210813 | A1 | 11/2003 | Oosawa |
| 2008/0025638 | A1 * | 1/2008 | Chen et al. ............... 382/284 |
| 2008/0031412 | A1 | 2/2008 | Lang et al. |
| 2008/0118137 | A1 | 5/2008 | Chen et al. |

FOREIGN PATENT DOCUMENTS

| EP | 1 424 650 | 6/2004 |
| EP | 1 598 778 | 11/2005 |
| GB | 2402470 | 12/2004 |
| WO | WO-2006/014707 | 10/2006 |

OTHER PUBLICATIONS

Patent Cooperation Treaty International Search Report and Written Opinion of the International Searching Authority dated Jul. 20, 2009 for PCT/US2009/045276, 12 pages.

(Continued)

*Primary Examiner* — Kevin Pyo
(74) *Attorney, Agent, or Firm* — Wilmer, Cutler, Pickering, Hale & Dorr LLP

(57) ABSTRACT

A method and system for detection and tracking of osteoporosis is disclosed. A method of characterizing an image of a target vertebra includes building a computer model from a set of sample images of pathological and non-pathological variations of vertebrae representing variations in shape of the vertebrae. The method also includes receiving an image of a target vertebra of a subject and automatically estimating contours of lateral outlines of the superior and the inferior cortical endplates of the image. The parameters of the model are varied to determine a set that represents a model shape that approximates the estimated contours of the outlines of the cortical endplates. The method includes automatically characterizing the target vertebra based on the set of model parameters that are determined and outputting on a display device the characterization of the target vertebra.

26 Claims, 8 Drawing Sheets

OTHER PUBLICATIONS

Bland and Altman "Measurement Error" *British Medical Journal*, 1996; vol. 313:744 Sep. 21, 1996.

Boini et al., *Annals of the Rheumatic Diseases*, The Eular Journal. 2001; 60: 817-827.

Brett, A.D. "Statistical Modeling for the Assessment of Vertebral Shape in vivo" Optasia Medical Power Point Presentation, BioImaging Seminar, May 31, 2007 (7 pages).

Brett, A.D. et al. "Automated Assessment of Vertebral Shape by Statistical Shape Modelling on Lateral radiographs" ABSMR Abstract Publication. Sep. 14, 2007 (2 pages).

Brett, A.D. et al. "Automated Assessment of Vertebral Shape on Lateral Radiographs by Statistical Shape Modeling" RSNA 2007 Abstract, Nov. 25, 2007 (1 page).

Brett, A.D. et al. "Automated Assessment of Vertebral Shape by Statistical Shape Modeling on Lateral Radiographs" ASBMR Poster Presentation, Sep. 19, 2007 (1 page).

Bruynesteyn et al., "Determination of the Minimal Clinically Important Difference in Rheumatoid Arthritis Joint Damage of the Sharp/van der Heijde and Larsen/Scott Scoring Methods by Clinical Experts and Comparison with the Smallest Detectable Difference" *Arthritis & Rheum*, 2002; 46(4):913-920.

Cootes T.F. et al., "Active Appearance Models", European Conference on Comptuer Vision, vol. 2, No. 1, Jan. 1, 1998, pp. 484-498.

Cootes T.F. et al., "Use of Active Shape Models for Locating Structures in Medical Images", Image and Vision Computing, vol. 12, No. 6, Jul. 1, 1994, pp. 355-365.

Cootes T.F., et al., "Constrained Active Appearance Models", Proceedings of the Eight IEEE International Conference on Computer Vision, Jul. 7-14, 2001, vol. 1, pp. 748-754.

Cootes, et al., *Training Models of Shape from Sets of Examples*, in Proc. BMVC Springer-Verlag, pp. 9-18, 1992.

Cootes, T.F. and Taylor, C.J. "Anatomical statistical models and their role in features extraction," *Brit. J. Radio.* 77(2004):S133-S139.

Davies, R.H. et al. "A minimum description length approach to statistical shape modeling," *IEEE Trans. Med. Imag.* 21(5) May 2002: 525-537.

Duryea, J. et al. "Trainable rule-based alforithm for the measurement of joint space width in digital radiographic images of the knee," *Med. Phys.* 27(3) (Mar. 2000):580-591.

European Examination Report, European Patent Application No. 06 738 603.7, dated Jul. 24, 2008 (7 pages).

Fleute, M. "Nonrigid 3-D/2-D registration of images using statistical models," Lecture Notes in Computer Science, Springer Verlag, New York, NY. US (Sep. 19, 1999):138-147.

Fleute, M. et al. "Incorporating a statistically based shape model into a system for computer-assisted anterior cruciate ligament surgery," *Med. Imag. Anal.* 3(3):209-222 (1999).

Genant et al., "Assessment of Rheumatoid Arthritis Using a Modified Scoring Method on Digitzed and Orig Radiographs" *Arthritis Rheum*, 1998; 41:9 pp. 1583-1590.

Johnson and Wichern, *Applied Multivariate Statistical Analysis*, pp. 458-513 (Prentice Hall 5th Edition, 2002) (67 pages).

Langs et al., "Model-Based Erosion Spotting and Visualization in Rheumatoid Arthritis" Academic Radiology, vol. 14, No. 10, Sep. 20, 2007, pp. 1179-1188.

Langs et al., "ASM Driven Snakes on Rheumatoid Arthritis Assessment" Scandinavian Conference on Image Analysis 2003, Lecture Notes in Computer Science 2749, pp. 454-461, 2003 and Academic Radiology 2007.

Patent Cooperation Treaty International Search Report, dated Jul. 30, 2008, 5 pages.

Rau et al., "A Modified Version of Larsen's Scoring Method to Asess Radiologic Changes in Rheumatoid Arthritis" *The Journal of Rheumatology*, 1995; 22:10 pp. 1976-1982.

Scott et al., "Proposed Modification to Larsen's Scoring Methods for Hand and Wrist Radiographs" *British Journal of Rheumatology* 1995; 34: 56 (1 page).

T.F. Cootes and C.J. Taylor, Statistical Models of Appearance for Medical Image Analysis and Computer Vision, in Proc. SPIE Medical Imaging, vol. 4322 (2001) 236-248.

Van Der Heijde et al., "Reading radiographs in chronological order, in pairs or as single films has important implications for the discrim. Power of rehuamtoid arthritis clinical trials." *Rheumatology* 1999; 38: 1213-20.

Van Der Heijde et al., "Effects of Hydrochloroquine and Sulphasalazne on Progression of Joint Damage in Rheumatoid Arthritis" *The Lancet*, May 13, 1989; pp. 1036-1038.

Zhang et al., Local Features and Kernels for Classification of Texture and Object Categories: A Comprehensive Study, International Journal of Computer Vision, 73(2) 213-238, 2007.

S.J. Caulkin, *Generating Synthetic Abnormalities in Digital Mammograms Using Statistical Models*, Ph.D. Thesis, Universtiy of Manchester, 2001 (pp. 1-228, 266-268).

\* cited by examiner

METHODS OF AND SYSTEM FOR DETECTION AND TRACKING OF OSTEOPOROSIS

CROSS-REFERENCE TO RELATED APPLICATIONS

This application claims the benefit under 35 U.S.C. §119(e) to U.S. Provisional Patent Application No. 61/057,369, entitled Methods Of And System For Detection And Tracking Of Osteoporosis, filed May 30, 3008, the contents of which are incorporated by reference herein.

BACKGROUND OF THE INVENTION

1. Field of the Invention

The present invention generally relates to methods and systems for automated or semi-automated analysis of digitized radiographs for research and various other investigational uses and, more specifically, to method and systems for diagnosis and tracking of osteoporosis.

2. Description of Related Art

Osteoporosis is a common skeletal disorder characterized by a decrease in bone mass, leading to bone fragility and an increased risk of fractures. There are about 10 million Americans over the age of 50 with osteoporosis. Thirty-four million more have low bone mass of the hip, which puts them at high risk for osteoporotic fractures and related complications later in life. Although effective diagnostic methods and treatments are available, only about 1 in 5 patients indicated for diagnostic evaluation gets tested. Only about 1 in 3 patients who is diagnosed with osteoporosis is offered treatment. Of those on treatment, compliance is low because of side effects of drugs and poor monitoring tools. Of those who start treatment, many stop treatment after 6 months, although it takes 2-3 years for the treatment to be effective.

In the US, osteoporosis resulted in 2 million fractures in 2005, at a direct cost to society of $17 billion. With the aging population, both fractures and costs are projected to rise 50% by 2025. Better tools are needed to diagnose patients, treat those who can benefit from treatment, make sure that the treatment is effective, and to ensure that patients comply with treatment.

Any bone can be affected by osteoporosis, but the fractures typically occur in the hip, spine (vertebrae), and wrist. Although hip fractures are the most serious in terms of morbidity and mortality, vertebral fractures are most important for the diagnosis and prognosis of disease.

Vertebral fractures can be asymptomatic, but can have serious consequences including severe acute and chronic back pain, back deformity, and increased mortality. Furthermore, vertebral fractures are the most common osteoporotic fracture, they occur in younger patients, and their presence is known to be a good indicator for the risk of future spine and hip fractures. This makes the presence of vertebral fractures an important factor in clinical decision making and the primary endpoint in many clinical trials to assess osteoporosis incidence and monitor its progression. In fact, it is in the accurate diagnosis of asynpitomatic vertebral fractures that radiologists make perhaps the most significant contribution to osteoporotic patient care.

In everyday clinical practice, vertebral fractures are usually diagnosed by visual inspection of the patient's spinal radiographs. However, this qualitative approach to identify vertebral fractures is regarded as subjective and therefore may lead to disagreement, especially when performed by inexperienced observers. Precise and accurate visual scoring of vertebral x-rays is a complex, time-consuming process that requires highly specialized training and expertise to perform. For this reason, access to quantitative objective scores has not been generally available to the physician in the point-of-care setting. Instead, most physicians have been forced to rely only on narrative interpretations when making treatment decisions. As a consequence, they sometimes miss mild vertebral fractures, which can lead to inadequate—and even inappropriate—treatment.

For epidemiological studies and clinical drug trials in osteoporosis research, objective and reproducible results are required. Therefore more than a decade ago the semiquantitative (SQ) method was proposed by Genant et al. in *J Bone Miner Res*, 1993, 8:1137-1148; and the quantitative (e.g., vertebral morphometry) methods of defining prevalence and incidence of vertebral fractures were proposed by Eastell et al. in *J Bone Miner Res*, 1991, 6:207-25 and Mc Closkey et al. in *Osteoporos Int*, 1993, 3:138-147.

The SQ method is based on evaluation of conventional radiographs by radiologists or experienced clinicians in order to identify and then classify vertebral fractures. Vertebrae T4-L4 are graded by visual inspection and without direct vertebral measurement as normal (grade 0), mild but "definite" fracture (grade 1 with approximately 20-25% reduction in anterior, middle, and/or posterior height, and 10-20% reduction in area), moderate fracture (grade 2 with approximately 25-40% reduction in any height and 20-40% reduction in area), and severe fracture (grade 3 with approximately 40% or greater reduction in any height and area). Additionally, a grade 0.5 is used to designate a borderline deformed vertebra that is not considered to be a definite fracture.

In contrast, quantitative vertebral morphometry involves making measurements of vertebral body heights on lateral radiographs. Six-point placement, the most widely used technique, utilizes manual placement of landmarks on the four corner points of each vertebral body from T4 to L4 and an additional point in the middle of the upper and lower endplates. Theses points are then used to define the anterior, middle and posterior heights of each vertebral body. The fracture grade is then derived from these three height measures or from the ratios between the heights, possibly in comparison with population-based measurements and/or normalized for inter-patient variability by comparison with measurements taken from a neighboring or reference vertebra. In clinical trials, the US Food & Drug Administration (FDA) defines a fracture as a reduction in height of 20% and more than 3 mm.

Studies have shown that a large number of fractures go undiagnosed with the current SQ and quantitative methods. More precise, objective and rapid measures of vertebral deformity are therefore needed using the automated approach of computerized analysis of digital x-ray images. Furthermore, accurate computerized vertebral fracture detection and classification may benefit from capture of vertebral shape information beyond standard 6-point morphometry, similar to the visual cues that characterize semi-quantitative vertebral assessment.

The development of a computer-assisted system for placement of the measuring points the six-point placement technique mentioned above is discussed by Kalidis L et al. in Ring EFJ (ed) *Current research in osteoporosis and bone mineral measurement II, British Institute of Radiology*, 1992, London, pp 14-16. The procedure is based on an algorithm that automatically locates the vertebral body contour in the digitized X-ray image and then is checked by the operator for accuracy. Correction is possible through operator intervention at any time. The system also performs additional geometric calculations, enhancing the diagnostic capability of quantitative vertebral morphometry.

More recently, Kasai et al. reported another approach based on edge detection in *Proc. SPIE* 6144. Their computerized scheme is based on the detection of upper and lower edges of vertebrae on lateral chest images. A curved rectangular area which included a number of visible vertebrae was identified. This area was then straightened such that the upper and lower edges of the vertebrae were oriented horizontally. For detection of vertebral edges, line components were enhanced, and a multiple thresholding technique followed by image feature analysis was applied to the line enhanced image. Finally, vertebral heights determined from the detected vertebral edges were used for characterizing the shape of the vertebrae and for distinguishing fractured from normal vertebrae.

In *Radiology*, 1999, 211:571-578, Smyth et al. describe the development of a technique based on use of an active shape model (ASM). An ASM is a statistical model that describes "what an object looks like" in terms of its shape and its imaging appearance. The ASM was applied to the measurement of vertebral shape on lateral Dual Energy X-Ray Absorptiometry (DXA) scans of the spine and contained 73 landmark points. The full vertebral shape description was found to be marginally more effective than was the vertebral height description for distinguishing fractured form normal vertebrae. In *Investigative Radiology*, 2006, 41 (12), Roberts et al. statistically modeled the shape and appearance of vertebrae on 250 lateral DXA scans using a sequence of active appearance models (AAMs) of vertebral triplets. The models were matched to unseen scans given an approximate initial location of the centre of each vertebra. Each vertebral contour used 40 points around the vertebral body with 8 further points around the pedicles for L4-T10, and 32 points per vertebra for T9-T7. The authors do not address endplate shape, but rather, focus on the image texture.

DXA imaging has some advantages over conventional radiography, namely a lower radiation dose and less distortion of the vertebral body images by projection artifact. However, radiography is still preferred in the diagnosis of vertebral fracture due to its higher imaging resolution and lower noise in image formation which means that, in contrast to DXA images, a radiographic image can depict the collapse of the cortical endplate.

There have been a number of attempts to detect and measure vertebrae in radiographs using statistical models of shape and appearance. Long et al. in *Proc. SPIE* 3979:169-179 describe constructing an ASM in the researching of algorithms to segment anatomy in radiographs of cervical vertebrae to derive from the segmented data measurements useful for indexing this image set for characteristics important to researchers in rheumatology, bone morphometry, and related areas. To construct the ASM, for each vertebra, 24 points were collected; six of these correspond to the standard 6-point morphometry set (corners and superior/inferior midpoints on each vertebra). The other points consist of anterior and posterior midpoints and, around each of the corners, four additional points were collected, two on each side of a corner point. In related work, the use of AAMs is described by Zamora et al. in: *Proc SPIE* 5032:631-642 and by Howe et al. in *Proc IEEE* 6th *SSIAI*. 2004:182-186.

In *Med Image Analysis*, 2007, 11:503-512, de Bruijne et al. describe the use of pairwise conditional shape models trained on a set of healthy spines, the most likely normal vertebra shapes are estimated conditional on the shapes of all other vertebrae in the image. The difference between the true shape and the reconstructed normal shape is subsequently used as a measure of abnormality. A total of 52 landmarks was placed along the upper, anterior, and lower boundary of each vertebra, interpolated equidistantly between the four vertebral corners.

Roberts describes an extension to his work to include radiographs in *Proc. Medical Image Understanding and Analysis*, 2006, I:120-124. To build an AAM, each vertebral contour uses 60 points around the vertebral body with 8 further points around the pedicles. The endplate rims were modeled using a quasi-elliptical shape, rather than the single edge previously used for DXA images. The accuracy of the search was characterized by calculating the absolute point-to-line distance error for each point on the vertebral body.

BRIEF SUMMARY OF THE INVENTION

Under one aspect of the invention, a method and system for detection and tracking of osteoporosis is provided.

Under another aspect of the invention, a method of automatically characterizing a digitized image of a lateral view of a target vertebra is provided. The target vertebra has a superior and an inferior cortical endplate, and the image of the target vertebra including lateral outlines of the cortical endplates. The method includes, during a model building phase, building a computer model from a set of sample lateral images of pathological and non-pathological variations of vertebrae. The computer model includes a set of parameters to represent variations in shape of the vertebrae. The method also includes, during a runtime phase, receiving a digitized image of a lateral view of at least one target vertebra of a subject and automatically estimating contours of the lateral outlines of the superior and the inferior cortical endplates of the at least one target vertebra of the image. During the runtime phase, at least one of the parameters of the computer model is varied to determine a set of model parameters that represents a model shape that approximates at least the estimated contours of the lateral outlines of the cortical endplates of the image. Also during the runtime phase, the method includes automatically characterizing the target vertebra based on the set of model parameters that represents the model shape that approximates at least the estimated contours of the lateral outlines of the cortical endplates of the image and outputting on a display device the characterization of the target vertebra.

Under a further aspect of the invention, the characterizing the target vertebra is based on the set of model parameters that includes a relative comparison of more than one parameter of the set.

Under still another aspect of the invention, the method includes automatically determining if at least one of a depression of the cortical endplate and fracture of the cortical endplate is present in the digitized image of the lateral view of the target vertebra based on the set of model parameters that represents the model shape that approximates at least the estimated contours of the lateral outlines of the cortical endplates of the image.

Under a further aspect of the invention, the method also includes displaying a visual representation of the model shape that approximates at least the estimated contours of the lateral outlines of the cortical endplates of the image, receiving input to modify the displayed model shape, and modifying the set of parameters to represent the modified model shape. The automatically characterizing the target vertebra is based on the modified set of model parameters.

Under another aspect of the invention, the set of parameters of the computer model to represent variations in shape of the vertebrae include information that represents mean spatial locations for features of the sample set of pathological and non-pathological variations of vertebrae, and the set of parameters includes measures of amounts that the features can vary from the mean spatial locations.

Under still another aspect of the invention, the varying at least one of the parameters of the computer model to determine the set of model parameters that represents the model shape that approximates at least the estimated contours of the lateral outlines of the cortical endplates of the image includes sampling a set of image data from locations on the image of the target vertebra that correspond to locations along an instance of a shape of the computer model and estimating a fit between the image of the target vertebra and the instance of the shape of the computer model based on the set of image data. This aspect also includes iteratively varying the at least one parameter of the computer model, sampling the set of image data from locations on the image of the target vertebra that correspond to locations along the varied instance of the shape of the computer model, and estimating the fit between the image of the target vertebra and the varied instance of the shape of the computer model based on the set of image data from the image of the target vertebra until the difference between the fit of successive instances of the shapes of computer model and the image meets a predetermined criteria.

Under another aspect of the invention, a method of automatically characterizing a digitized image of a lateral view of a target vertebra is provided. The target vertebra has at least one of double posterior margins, double endplates, an anterior margin, osteophytes on an inferior portion of an anterior margin, and osteophytes on a superior portion of an anterior margin. The method includes, during a model building phase, building a computer model from a set of sample lateral images of pathological and non-pathological variations of vertebrae. The computer model including a set of parameters to represent variations in shape of the vertebrae. During a runtime phase, a digitized image of a lateral view of at least one target vertebra of a subject is received and at least one of contours of the double posterior margins, contours of the double endplates, contours of the anterior margin, contours of osteophytes on the inferior portion of an anterior margin, and contours of osteophytes on the superior portion of an anterior margin of the at least one target vertebra of the image are automatically estimated. Also during the runtime phase, at least one of the parameters of the computer model are varied to determine a set of model parameters that represents a model shape that approximates at least one of the contours of the double posterior margins, the contours of the double endplate contours, the contours of the anterior margin, the contours of osteophytes on the inferior portion of an anterior margin, and the contours of osteophytes on the superior portion of an anterior margin of the image. The method also includes, during the runtime phase, automatically characterizing the target vertebra based on the set of model parameters that represents the model shape that approximates at least one of the contours of the double posterior margins, the contours of the double endplate contours, the contours of the anterior margin, the contours of osteophytes on the inferior portion of the anterior margin, and the contours of osteophytes on the superior portion of the anterior margin of the image and outputting on a display device the characterization of the target vertebra.

Under still a further aspect of the invention, the method includes displaying a visual representation of the model shape that approximates at least one of the contours of the double posterior margins, the contours of the double endplate contours, the contours of the anterior margin, the contours of osteophytes on the inferior portion of the anterior margin, and the contours of osteophytes on the superior portion of the anterior margin of the image. This aspect also includes receiving input to modify the displayed model shape and modifying the set of parameters to represent the modified model shape. The automatically characterizing the target vertebra is based on the modified set of model parameters.

Under another aspect of the invention, the varying at least one of the parameters of the computer model to determine the set of model parameters that represents the model shape that approximates at least one of the contours of the double posterior margins, the contours of the double endplate contours, the contours of the anterior margin, the contours of osteophytes on the inferior portion of the anterior margin, and the contours of osteophytes on the superior portion of the anterior margin of the image includes sampling a set of image data from locations on the image of the target vertebra that correspond to locations along an instance of a shape of the computer model and estimating a fit between the image of the target vertebra and the instance of the shape of the computer model based on the set of image data. This aspect also includes iteratively varying the at least one parameter of the computer model, sampling the set of image data from locations on the image of the target vertebra that correspond to locations along the varied instance of the shape of the computer model, and estimating the fit between the image of the target vertebra and the varied instance of the shape of the computer model based on the set of image data from the image of the target vertebra until the difference between the fit of successive instances of the shapes of computer model and the image meets a predetermined criteria.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION

Preferred embodiments of the invention provide a system for creating a deformable model of lateral radiograph images of vertebral bodies and iteratively adapting the model to fit the shape of an image of a particular target vertebra in order to describe its features. These features include, for example, double posterior margins, double end-plate contours, an anterior margin, including the extent of any osteophytes, if present, superior and inferior cortical endplates, representing a depression of the cortical endplate and/or fracture of the cortical endplate (i.e., endplate fracture lines), if present. This description may be used to characterize the vertebral body for the purposes of normal or pathological classification and the determination of the probability of future fracture. In one implementation of the invention, a set of lateral radiographs of vertebrae, including images of normal and pathological vertebrae, are analyzed to create the deformable model using statistical learning techniques. The deformable model is then applied to a radiograph of the target vertebra to generate a two-dimensional map representing the shape of the target vertebra.

This shape map serves as the basis for generation of a set of derived measurements, or parameters, that capture various features and characteristics of the target vertebra. These derived measurements, in turn, can be used to (1) determine and/or describe irregularities present in the target vertebra, (2) track the vertebra's shape over time, and/or (3) provide information for pre-operative surgical planning and/or post-operative monitoring. These uses are merely a few examples of how the derived measurements may be used, and other possible uses are within the scope of the invention.

The methods and systems described herein can be used in combination with techniques disclosed in U.S. patent application Ser. No. 12/015,306, entitled Computer Program Products and Methods for Detection and Tracking of Rheumatoid Arthritis, filed Jan. 16, 2008, U.S. patent application Ser. No. 11/376,868, entitled Method and System for Characterization of Knee Joint Morphology, filed Mar. 16, 2006, both incorporated by reference herein. These applications describe the use of a deformable statistical template for use in characterizing various features of bones and/or joints found in radiographs. As described in greater detail below, the term deformable refers to a parameterization of the template in terms of a basis set of coordinates derived on the basis of sample training data. The term statistical refers to the basis of a model on an analysis of variation of parameters among members of a population of subjects.

Figure 1:
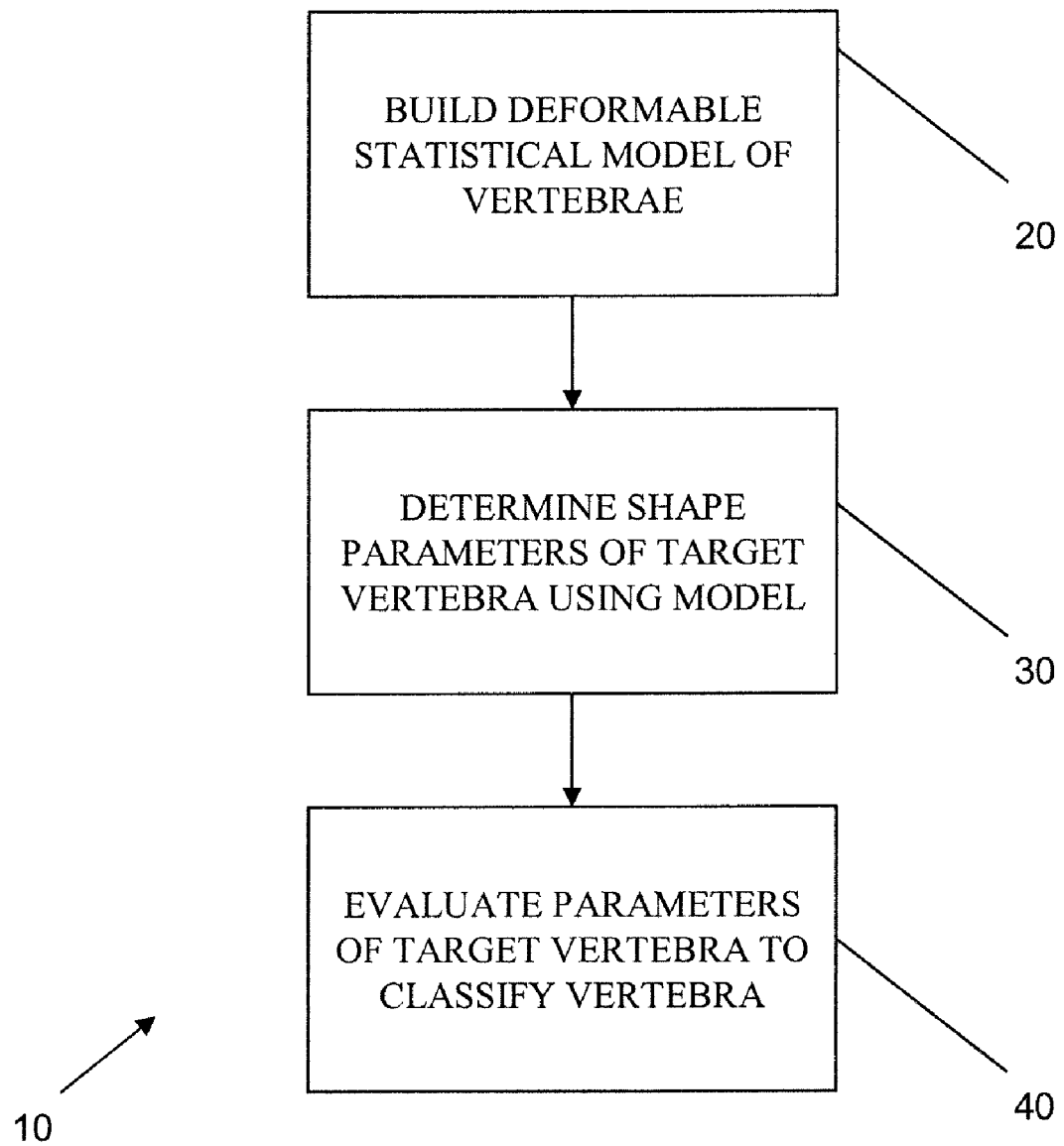
FIG. 1 is a flowchart of a computer-implemented method for classifying a target vertebra using a deformable statistical model of vertebrae.

FIG. 1 is a flowchart of a method 10 for classifying a target vertebra using a deformable statistical model of vertebrae. As described in greater detail below, the method starts by building a deformable statistical model of various vertebrae (step 20). In general, this model provides a statistical range of shapes to which a target vertebra can be compared. Thus, parameters that characterize the actual shape of the target vertebra can be determined by deforming the model to fit an image of the target vertebra (step 30). After the parameters of the target vertebra have been determined, the parameters can be evaluated using various techniques to classify the vertebra (step 40). For example, the vertebra can be classified as healthy or in a diseased state. In addition, this information can be used for the measurement and tracking of osteoporosis, the positioning, registration and measurement of the vertebral body for pre-operative surgical planning and/or post-operative monitoring for musculoskeletal surgical procedures, such as, e.g., kyphoplasty.

In accordance with an implementation of the present invention, methods and computer program products are provided for research and other investigative purposes or for diagnosing, and tracking the development of, symptoms associated with osteoporosis. More particularly, methods and computer program products are provided for detecting and monitoring the progression of vertebral fractures resulting from osteoporotic disease.

In such an implementation, a computer analysis of a digitized radiograph of a skeletal system that includes one or more vertebrae of the spinal column is carried out either automatically or semi-automatically using a deformable statistical template that has been produced by the statistical analysis of both the shape and texture of a number of hand- or machine-annotated sample radiographs of the normal and pathological anatomy of vertebrae of the spine. The term texture of radiograph refers to local spatial variations in pixel brightness, such as grayscale level.

Automatic annotation of a digitized radiograph of a vertebra provides a set of two-dimensional points (also referred to as landmarks, annotations, or loci, herein) that may be stored in a digital image and used to compare and monitor the changing contour and/or texture of a skeletal joint. The term annotation in some instances refers to the identification of certain landmark features, or salient boundaries or contours, in an image by overlying points and lines on the image to indicate the positions of the features or boundaries or contours.

The techniques described herein can be used to monitor and compare the progress of osteoporosis in the spine, changes in the shape of vertebral bodies, and changes in the overall shape and geometry of the spinal column. For instance, systems implementing the techniques disclosed herein can carry out a baseline and follow-up comparison in which the development of a patient's osteoporotic symptoms may be monitored by comparing amongst the baseline image and subsequent follow-up images in a longitudinal study involving the patient.

As stated above, vertebral fractures can be used to detect and monitor the progression of osteoporotic disease. In general, the term vertebral fracture refers to the radiographic appearance of an alteration in the shape and size of the vertebral body, with a reduction in vertebral body height, as a wedge, end-plate (mono- or biconcave), or collapse (also called "crush") vertebral deformity. In the case of an end-plate deformity, the fracture appears in a radiograph as a bright contour below the rims of the superior end of the vertebral body or above the rims of the inferior end of the vertebral body.

The vertebral bodies may be characterized by describing the shape of the vertebral body that incorporates all of the relevant outlines of the body as seen in an x-ray. These outlines can include the anterior margin, double posterior margins, double end-plate contours, superior and inferior circumferential margins, and the cortical endplates, among others. This description of the shape comes about by the dense landmarking of these margins. Additional characterization may be gained from derived measurements such as the anterior, middle and posterior heights, the projected area of the vertebral body and also a parameterized description of the shape of this vertebra as compared with the average vertebral body that has been statistically derived during the training of the system, described in more detail below.

During the progression of degenerative diseases of the spine, the vertebral bodies very often exhibit bony growths or osteophytes. The margins of vertebral bodies normally are smooth. Growth of new bone projecting horizontally at these margins identifies osteophytes. Most osteophytes are anterior or lateral in projection. Vertebral osteophytes are one of the principal radiographic diagnostic criteria for degenerative change in the lumbar spine. The characterization or measurement of such osteophytes may, therefore, be important in the assessment of such disease and indeed in the tracking and prognosis of osteoporotic disease.

By providing a highly detailed characterization of the vertebral body, the techniques disclosed herein enable the accurate determination of the presence and shape of osteophytes, the shapes of the various features of the vertebral body, and the shape of the vertebral fractures, if present. This enables the ability to accurately define incident fracture caused by osteoporotic disease, quantify the type and severity of the fracture, monitor the progression of the disease and resulting damage with accuracy and precision, and reproduce such reliable results.

In addition, information gained from the analysis of a radiographic image using a statistical deformable template lends themselves to various other uses in accordance with other implementations of the present invention. These other uses are based primarily on the fact that the template, in describing the shape and grayscale texture of an object in an image, must parameterize that object in terms of a statistical description of its shape and grayscale texture with reference to a mean and a modeled population of that class of objects. These other uses may be the characterization, assessment and tracking of osteoarthritic disease and other arthritic diseases such as ankylosing spondylitis or degenerative diseases of the spine that are manifested by shape changes of the vertebral bodies.

As set forth in greater detail below, radiographs of a vertebral body of the spinal column, of a person, or animal, can be analyzed or used to train a deformable statistical template. Typically, two-dimensional (2D) radiographic images representing the transmission of penetrating radiation, such as x-ray, through the lateral aspect of the spine are employed. While it is to be understood that the invention is not limited in scope to a particular imaging system or methods, nor to a particular modality for storage and manipulation of an obtained image, or images, there are advantages that arise from particular imaging modalities, such as the high spatial resolution advantageously provided by high energy radiation, such as x-rays or gamma rays.

As stated above in connection with FIG. 1, the first step in the computer-implemented method is to build a deformable statistical model of various vertebrae. This step is performed by analyzing lateral vertebral x-ray images (radiographs) or vertebral fracture assessment (VFA) x-ray images in order to segment and characterize the shape of a vertebral body. Lateral radiographs obtained at baseline from 165 study subjects participating in the population-based Canadian Multicentre Osteoporosis Study (CaMos) were digitized to standard format and utilized to construct a vertebral shape model using a statistical learning technique. This set of radiographs was enriched so that 50% of cases had at least one prevalent vertebral fracture defined as a minimum 20% posterior, medial or anterior height reduction by manual 6-point morphometric evaluation. A standardized lateral spine radiographic protocol was used to obtain films from all subjects.

Figure 3:
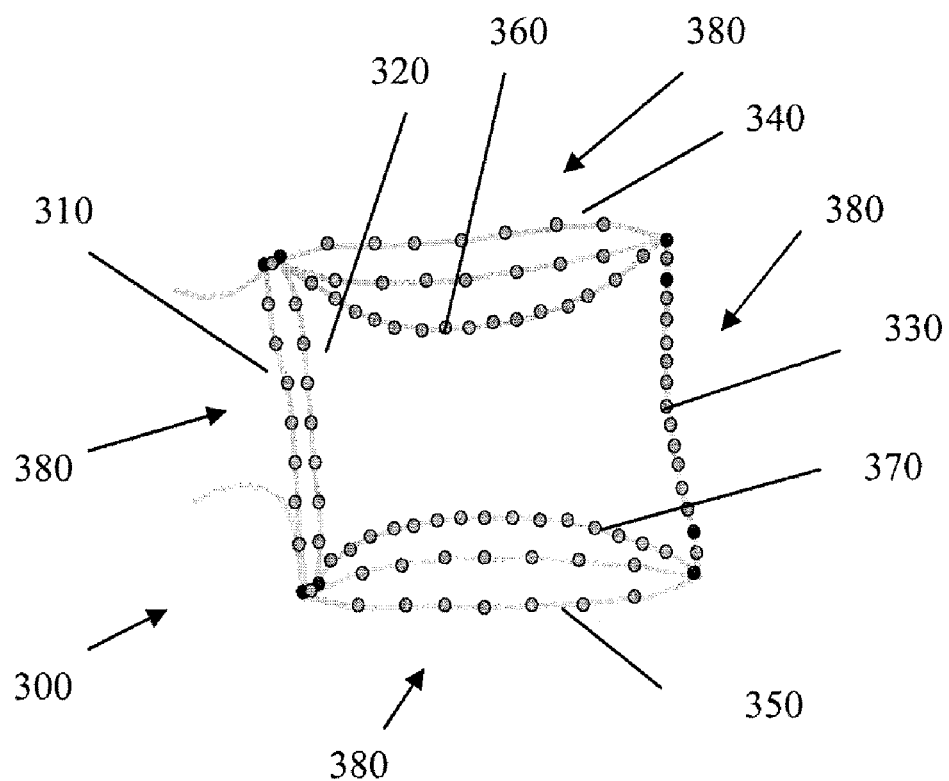
FIG. 3 is a lateral view of various features a vertebral body.
Figure 4:
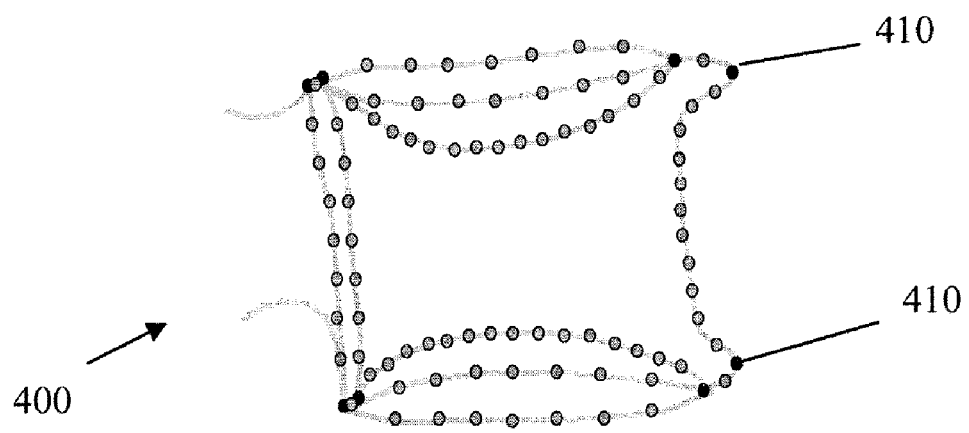
FIG. 4 is a lateral view of various features a vertebral body.

The radiographs from all 165 subjects were manually annotated. Of these, 100 were randomly chosen to build the vertebral model that can be altered in its shape and appearance using a statistical learning technique, described below. It is understood that more or less subjects and more or less radiographs may be used to build the vertebral model and remain within the scope of the invention. Each vertebra, from T4 to L4, was demarcated employing a standardized landmarking protocol by radiographic technicians using 95 points representing the circumferential vertebral borders, including right/left/central endplate margins, anterior/posterior margins, and osteophytes when present. FIGS. 3 and 4, discussed in more detail below, show examples of landmarks placed along the contours of features of a vertebra. Primary landmarks were defined anatomically as the four vertebral body corners and the greatest extent of any anterior osteophytes. Secondary landmarks resulted logically from placement of the primary landmarks, such as a point halfway between two primary landmarks, or a number of equally spaced landmarks along a curve defined between two primary landmarks. The number of secondary landmarks between the primary landmarks was chosen to ensure that the shape of the margins was captured with sufficient resolution to determine subtle changes between vertebral bodies. In particular, the cortical endplates and anterior margins where described with many more landmarks than the other margins. The model was trained automatically using a statistical analysis of the variation in anatomy and image acquisition found by comparing these annotated examples. As with the number of subjects and radiographs used to train the model, the number of landmark points may be greater or lesser than 95 and be within the scope of the invention.

In training the model, the sets of annotated landmarks describing each example vertebra were aligned by means of scaling, rotation and translation and this gives rise to an average or "base" shape. The radiographic appearance or texture of regions surrounding each landmark of the example annotations is collected. In order to gather additional appearance information that may be used for searching images, perturbations are applied to the example shapes to get texture information for off-target positions. The training consists of the creation of a set of source and target vectors. The target vectors represent the displacements needed to get from the current shape position to the correct shape position and the corresponding source vectors consist of sampled texture and current shape information. The relationship between source and target is then trained using linear regression. A deformable statistical vertebral model results from the regression.

The trained model can then be applied to a digitized target radiograph, which has been unseen by the model, to annotate a target vertebral body using the trained relationship described previously (this corresponds to step 30 in FIG. 1). The analysis of the target radiograph may be performed on either thoracic or lumbar images, or in the case of VFA images, on the entire spinal column contained in a single lateral image. For each vertebra analyzed, the co-ordinates of a set of 95 landmark points are determined. These landmarks represent the vertebral borders and various features, as shown in FIG. 3. FIG. 3 is a lateral view of various features of a vertebral body 300 and includes the outline of posterior margins 310 and 320, an anterior margin 330, a superior circumferential margin 340, an inferior circumferential margin 350, a superior cortical endplate 360, and an inferior cortical endplate 370. FIG. 4 is also a lateral view of various features a vertebral body 400, which illustrates similar features as shown in FIG. 3 and includes osteophytes 410.

After manual initialization using a single mouse point click in the approximate centre of each vertebral body as seen on a lateral vertebral x-ray, a deformable statistical model is used to perform automatic annotation of each vertebral body initialized. To start, an instance of the base shape (i.e., the average shape learned during training) is placed in the image and the surrounding image texture is sampled. The linear regression is applied to obtain the sought displacements. In general a few iterations of this procedure are needed to find a desirable solution. This process is repeated until there is convergence within a specified criterion or else until a specified maximum number of iterations have been executed. For example, the process may be repeated until no improvement is found during sequent iterations. When the iterations are completed, the output of the final step is a solution for the full set of 2D points as fit by the model parameters; this is an optimal fit. Optionally, after the automated analysis has been carried out, further refinement of the positions of the 95 landmarks may be made by semi-automated or manual means until the operator is satisfied with the result.

The resulting annotation, containing the 95 landmarks on the target radiograph, may now be used to define measurements relating to a vertebral body or a set of vertebral bodies in the analyzed radiograph (this corresponds to step 40 of FIG. 1). As mentioned above, more or less than 95 landmarks may be used to derive these measurements. Derived measurements from the completed annotation task may now be made based upon the geometry of the annotation landmarks. These derived measurements include some or all of: six point morphometry; vertebral shape described based on 95 point annotation; vertebral heights and height ratios based upon 6 point morphometry; inter-vertebral space measurements; kyphosis angle measurement; kyphosis irregularity measurement. In addition, derived vertebral deformity classifications may be made based on these geometric measurements. For example, in common with current practice, classification of prevalent fracture, classified into fracture categories of mild, moderate or severe, and wedge, biconcave or crush (see Genant et al. *Vertebral Fracture Assessment Using a Semiquantitaive Technique, Bone Miner Res.* September 1993; 8(9):1137-48, incorporated by reference herein).

The dense 95 point annotation technique described herein may also be used to derive a parameterization of shape of either a single vertebral body or a set of vertebral bodies. Such parameterization may be carried out by means of a shape model. In building a shape model, the original training sets of annotated landmarks describing each example vertebra were aligned by means of scaling, rotation and translation. Principal component analysis (PCA) was performed on the residual shape deviations to describe shape variation. New shapes representing the lateral anatomy of vertebrae may be linearly modeled as the sum of the mean shape plus a weighted combination of the most significant principal components using PCA techniques known in the art.

A parameterization of the shape of a target vertebra described by the 95 point annotation is achieved by finding a best fit of an instance of the model to the annotation of the target. This parameterization may then be used as the input to a multi-dimensional classifier for the classification of prevalent fracture, if present, based on shape. In the alternative, the parameterization can be an input to a multi-dimensional classifier used to predict fracture/non-fracture outcome of an individual vertebral body over an extended period of time. For example, a 5 year time-period can be used, but longer or shorter time frames are within the scope of the invention. Further still, the final positions of the 95 landmark points of any one or many annotated vertebral bodies for a single subject are used as a shape vector as input to a multi-dimensional classifier used to predict fracture/non-fracture outcome of any vertebral body over the extended period of time.

Figure 2A:
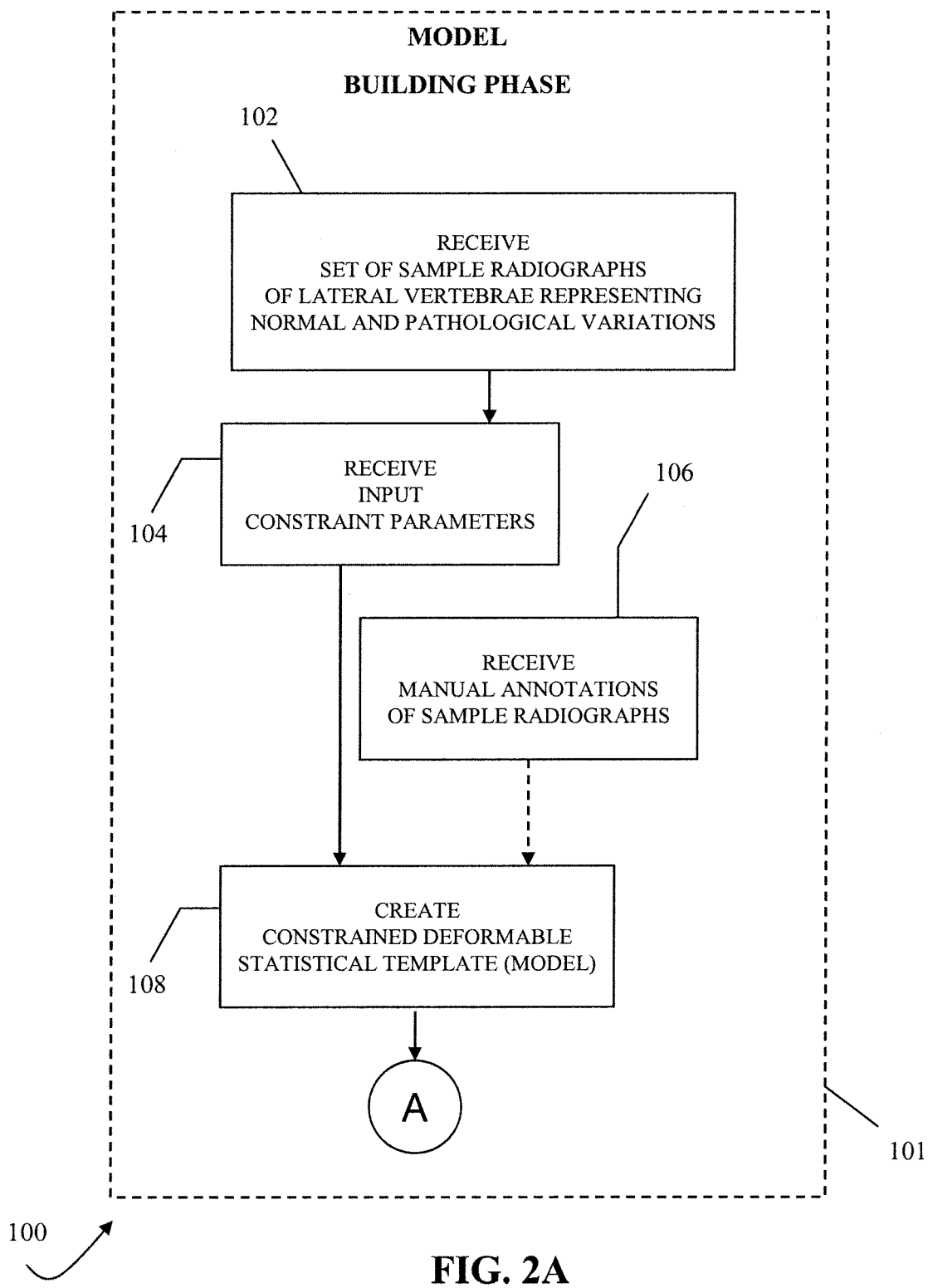
FIGS. 2A-B is a flowchart of a computer-implemented method for producing a deformable model of a vertebral body, fitting an image of a target vertebral body to the model, and deriving measures indicative of osteoporosis therefrom.
Figure 2B:
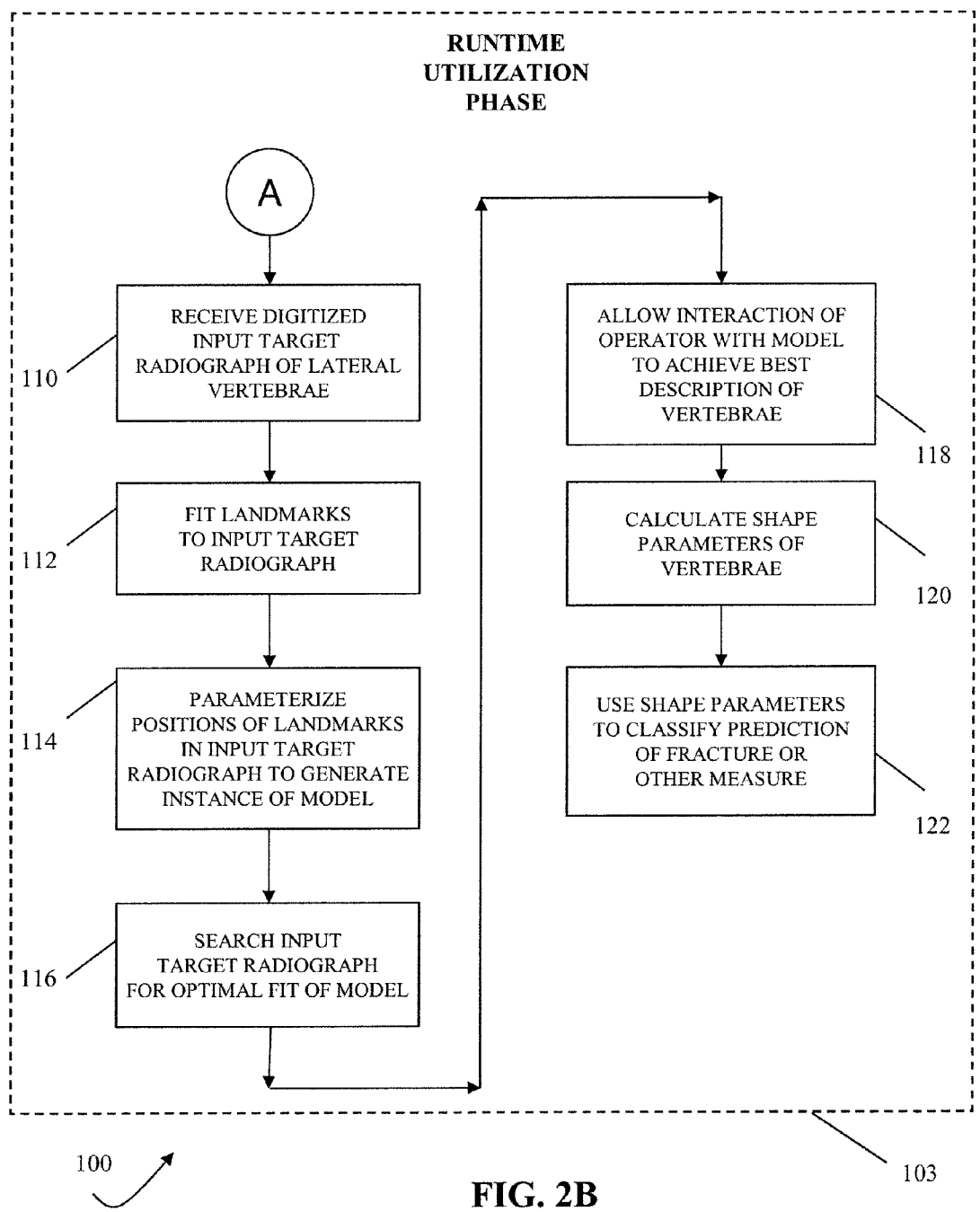

FIGS. 2A and 2B show a flow chart of a computer implemented method 100 for analyzing a radiograph image and deriving a measure indicative of osteoporosis in accordance with an embodiment of the invention. Method 100 is divided into two distinct phases. One is a Model Building Phase 101, shown in FIG. 2A, while the other is a Runtime Utilization Phase 103, shown in FIG. 2B. During the Model Building Phase 101, a constrained deformable statistical model (also called a template herein) is built and trained using sample images of vertebrae of individual subjects.

In accordance with the method, a set of sample radiographs of the lateral aspect of vertebrae T4 to L4 of the human spinal column that represent both normal and pathological variations is received (step 102). In some implementations, this can be achieved by using radiographs of the spines of individual subjects who are free of osteoporotic fractures, or other similarly afflicting disease and other radiographs of the spines of individual subjects who have osteoporotic fractures and other deformities of the vertebral bodies. Using such sample radiographs is important for building a model that can exhibit the ability to accommodate both normal and pathological vertebral body shape variations present in the radiograph that is to be analyzed after the model is built and trained. In addition, this allows an output vector of landmark positions of a segmented vertebral body to be presented as an image.

The accuracy to which a deformable statistical template can locate a boundary and represent pixel grayscale-levels is controlled by a particular statistical model. The template deforms in the ways that have been observed in a set of samples provided to the template for training. If the object in a radiograph being analyzed by the template exhibits a particular type of deformation not present in the training set, outside of a predetermined tolerance, the template will not fit to the object. This is true of fine deformations as well as coarse ones. For example, the template will usually fit to both normal and pathological shape variation in vertebral bodies only if radiographs of normal and pathological vertebral bodies are used to build and train the template.

Next, a set of input constraint parameters is received (step 104), for example, the average shape is only permitted to deform within +/−3 standard deviations from the average shape. When landmarks representing individual instances of a statistical template are synthesized during a runtime phase, such as Runtime Utilization Phase 103, the model is constrained in its allowed deformations of shape by choosing only the most important parameters. The learned deformation has been captured so as to represent typically 95% of the appearance represented by the training set, and then, as stated above, to allow these parameters to be limited to typically +/−3 standard deviations on each side of the mean shape. Thus, it is ensured that the shape generated by the template are similar to those in the original training set.

For example, the constraint parameters stop the deformable statistical template from producing individual instances that are very far from the mean in their shape and appearance. If the model is over-constrained, it may not adapt enough to pathological variations and produce "false negative," or indication of lack of disease where disease exists. If, on the other hand, the model is under-constrained, it may be too flexible and adapt to image evidence that is not representative of a vertebral body, producing a "false positive," or indication of disease where none exists.

Optionally, at step 106, manual annotations of the input sample radiographs are received for building a deformable statistical template semi-automatically. In some implementations, a deformable statistical template is built semi-automatically using hand-annotated sample radiographs, as described above. For example, a technician can hand-draw the outlines of features of a vertebral body in the sample radiographs. Manual annotations of the sample radiographs are not necessary when the template is built automatically.

In step 108, a constrained deformable statistical template, or a model, is created from the sample images. It is to be understood that creating a model encompasses both building and training the model. Building the model includes defining the general shape to be identified, whereas training the model includes determining how the general shape of the model can deform according to the sample radiographs of the training set. Analysis of a digitized input target radiograph of lateral vertebrae proceeds on the basis of the trained model, which is applied to the digitized target radiograph. The term model, or template, generally refers to any mathematical description that provides for parameterization of the shape, appearance, position and/or motion of a subject or its component parts. When a model is said to be statistical, it is to be understood that the model is based on an analysis of variation of parameters among members of a population of individual subjects.

The models and techniques disclosed herein are described with reference to "landmarks", which are a set of two-dimensional (2D) points that outline a vertebra. FIG. 3 shows these landmarks placed along the outlines of features of a sample vertebra 300. In FIG. 3, the continuous lines represent the outline of posterior margins 310 and 320, an anterior margin 330, a superior circumferential margin 340, an inferior circumferential margin 350, a superior cortical endplate 360, and an inferior cortical endplate 370. Meanwhile, landmarks 380 are illustrated by dots positioned along the outlines of the vertebral features.

More particularly, the models described herein represent the average relative positions the landmarks 380, along with a mathematical description of the way these relative positions may vary in normal and pathological circumstances among individuals. In addition, the models can capture the variation in the position of the landmarks in a particular individual with the passage of time or due to an intervening circumstance, such the progression of osteoporosis.

The techniques set forth in this application determine a mathematical model of plausible morphologies of a modeled object (e.g., a vertebra), wherein morphology encompasses shapes and shape variations, and may also encompass other aspects of appearance such as the texture of a modeled object. A method, such as method 100, is employed for applying the model to input data obtained from a digitized target radiograph of a specified vertebrae. The method is not, however, specific to any particular placement of a set of points that are placed automatically, or semi-automatically, on features of the vertebrae or entire vertebral column.

For the purpose of building a model, the relative positions of the two-dimensional (2D) points are consequential, rather than absolute, space-referenced positions. Thus, in building the model, the first step is typically to align each frame of 2D data to a common frame of reference, as may be achieved by using one of various standard alignment techniques, such as "Procrustes Analysis," which is described by Cootes et al., *Training Models of Shape from Sets of Examples*, in *Proc. BMVC Springer-Verlag*, pp. 9-18, 1992, incorporated by reference herein. However, other alignment techniques may be employed and be within the scope of the invention.

In some embodiments, a training set of radiographic images, or radiographs, with marked up features are used to build a statistical model. A set of radiographs of a vertebra is used wherein the outlines of the vertebra are delineated using a set of two-dimensional (2D) coordinates, also referred to as a shape. The shapes are all aligned to a common frame of reference, generally defined by the base shape of the training set. The base shape is obtained by (1) removing the mean of each sample shape, (2) aligning the corresponding shapes to each other, and then (3) normalizing the length of the shape vectors to unit length. Computation of the base shape can be achieved, for example, using the "Procrustes Algorithm" by Cootes et al.

A shape can be described as a column vector x in Equation (1):

$$x\{x_1, x_2, \ldots, x_n, y_1, y_2, \ldots, y_n\}^t,$$

where $(x_i, y_i)$ are the 2D coordinates of the point (i.e., landmark) with index "i" and the superscript "t" that denotes the transpose operation. In some embodiments, the shapes are aligned to the reference frame of the model using a method described by T. F. Cootes and C. J. Taylor, *Statistical Models of Appearance for Medical Image Analysis and Computer Vision*, in *Proc. SPIE Medical Imaging*, (2001), incorporated by reference herein. The shapes are described by this method as a vectors x' in Equation (2):

$$x'=T(x),$$

where x' is the result of applying the matrix of computed alignment transformation parameters, T, to x.

After the alignment of the sample shapes, the training set can be represented by a matrix X', where the aligned sample shapes are stored in the columns of X'. The base shape is now by definition the mean of the columns of X'.

For modeling the texture of the radiographs, sampling points (i.e., landmarks) are defined with respect to the reference frame of the base shape. The grayscale-values at the location of these sampling points can be collected in a column vector g in Equation (3):

$$g=\{g_1, g_2, \ldots, g_m\}^t,$$

where $g_i$ is the grayscale-value of the sampling location with index "i". Because the aim is to predict displacements from texture and position information, perturbations are applied to the example shapes to get texture information for off-target positions.

These perturbations consist of two components. The first component takes care of global properties, such as scaling, rotation and translation, whereas the second takes care of local displacements. These displacements can be obtained in different ways. For example, two example shapes are chosen randomly and a fraction of their difference is chosen as perturbation. Another option is to randomly displace all the points of an example shape. Since the amount of data obtained in this way is often in higher dimension, it can be advantageous to perform dimension reduction operation. An example is Principal Component Analysis (PCA), as described by Johnson and Wichern, in *Applied Multivariate Statistical Analysis*, pp. 458-513 (5$^{th}$ Edition, 2002), incorporated by reference herein.

It is also advantageous to make the texture samples as invariant as possible with respect to intensity variations across the example images. Local and global normalization schemes, such as the Procrustes Analysis, can be used for this purpose. Such an appropriate normalization procedure is applied before dimension reduction. After dimension reduction, a transformation R maps a vector g to a vector b of lower dimension. In the case of PCA, this transformation can be written as Equation (4):

$$b=R\,g,$$

where R is the transformation matrix.

A direct advantage of PCA is that an estimated reconstruction of the texture vector g can be synthesized as in Equation (5):

$$g_r=\breve{g}+R^t b,$$

where $g_r$ is the reconstructed vector and $\breve{g}$ is the mean of the samples used to compute the PCA. However, other methods for synthesizing texture vectors based on the training data are also available.

After obtaining the dimension reduction transformation, the model is ready to be trained. The training consists of the creation of a set of source and target vectors. The target vectors represent the displacements δx' needed to get from the current shape position to the correct shape position in the frame of reference of the base shape. The corresponding source vectors consist of two contributions. The first is the texture information encoded by the vector b, the second is the difference δs between the current shape in the reference frame of the base shape and the base shape itself.

To obtain the training data, the sample data is again perturbed in a similar way as described above. The target and source vectors are stored for each perturbation. Their relationship can be trained using methods, such as statistical classifiers or via linear regression, that are known in the art. In the current implementation, linear regression is used. Thus the predicted displacements are given by Equation (6):

$$\delta x' = A[b|\delta s]$$

where $\delta x'$ is the vector of updates to the current point positions in the reference frame of the base shape, A is the regression matrix, and b is as defined above and $\delta s$ is the vector of differences between the current shape in the reference frame of the base shape and the base shape itself.

Referring to FIG. 2B, during Runtime Utilization Phase 103, the model created during Model Building Phase 101 is applied to a digitized target radiograph to describe the individual vertebral bodies or sets of vertebral bodies in the digitized target radiograph of the lateral spine. In other words, a digitized target radiograph, which is unseen by the model (i.e. has not been used to train the model), is annotated using the trained relationship described in the Equation (6).

Figure 5:
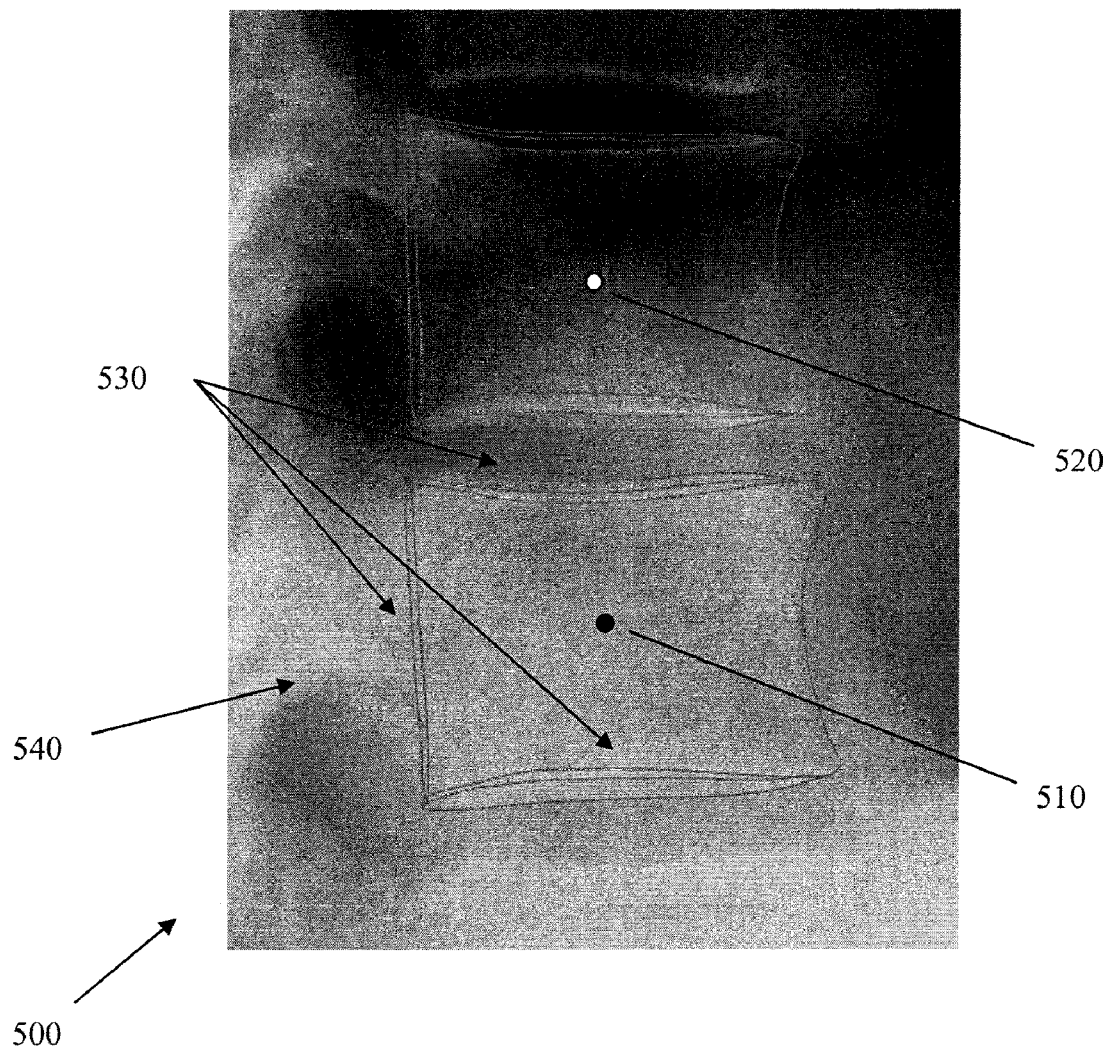
FIG. 5 is a lateral radiograph of two vertebrae.

First, a digitized target radiograph of a number of vertebral bodies is received (step 110). An operator indicates which vertebrae of the target radiograph are to be analyzed by placing a point in the approximate centre of each vertebra on the target radiograph. At least two vertebral bodies are indicated in the radiograph by this method. FIG. 5 is a radiograph of a portion of a spine 500 and shows the approximate center point of two adjacent vertebrae as indicated by points 510 and 520.

Next landmarks are fitted to the digitized target radiograph to prepare for parameterization of the vertebrae in the target radiograph (step 112). The specified points are preliminarily identified, or annotated, in an image of a spine or set of vertebral bodies. To perform the fit of landmarks, an approximate position, scale and orientation are calculated from the operator-placed points 510 and 520 for each vertebral body present in the radiograph and a scaled and rotated instance of the base shape of the model is placed in the image at each vertebral body position. The grayscale values of the image are sampled according to the position of the base shape for a particular vertebra. After applying the dimension reduction R used in Equation (4) on the grayscale values the linear regression is applied to obtain the sought displacements. In general, iterations of this procedure are performed to find a desirable solution, e.g., as when no improvement is seen from one iteration to the next, when a specified maximum number of iterations have been executed. When the iterations are completed, the output of the final step is a solution for the full set of 2D points as fit by the model parameters.

In other embodiments, a semi-automatic analysis is performed to fit the landmarks to the input target radiograph (in place of step 112). The user of a system implementing this embodiment of the method is asked to define some subset, also referred to as proper or full, of landmarks on the vertebral bodies in the radiographs that were identified in creation of the deformable statistical template. These positions are defined in such a manner as to effectively describe the radiographic appearance of the vertebra either by relation to external, or other, features.

In the next step, the positions of the plurality of landmarks in the digitized target radiograph are parameterized, thereby generating a particular instance of the statistical template that captures the shape features of the target radiograph (step 114). Even though the precise morphology of a vertebra varies among subjects and changes with time, these landmarks remain identifiable.

The statistical nature of the model allows for parameterization of the shape of vertebrae in terms of a finite number of values. For example, the mean and normal variation, or other statistical moments, represent characterizations of the radiographic appearance of the particular vertebra across an ensemble of subjects. However, the techniques disclosed herein are not limited to any one particular scheme of parameterization, and other measure may be used to capture the shape information associated with a particular vertebral image.

In the next step, the digitized target radiograph is searched using the constrained deformable statistical model until an optimal fit of the landmarks of the target image to the model is found (step 116). A search algorithm matches the deformable statistical template to the target image. FIG. 5 shows one example of the output from such an operation. Contour lines 530 illustrate the fit of the deformable model to the image of a target vertebra 540. The search algorithm uses the sampled image grayscale-level appearance, also referred to as texture, and the differences between average shape and the shape determined in step 112 to predict displacements to the positions of model landmarks needed to match the landmarks identified for the target shape. This locates a better position for each landmark feature in the radiograph. The search algorithm iterates until the differences between the current estimate of landmark feature positions and calculated update positions have no statistically significant difference. At this point, the deformable statistical template is said to have reached an "optimal fit" to the image.

In this way, the statistical model is used to predict the movement of the landmarks of the model to a location characterizing the skeletal morphology of the vertebra in the target image. The prediction is based on texture and position parameters of the actual instance of the model and produces displacements to update the current locations of the landmarks to match what is seen in the target radiograph.

Thus, because the deformable statistical template has been used to detect and annotate the vertebra, a parameterization of the vertebral shape may be determined from optimized fit of this template. Therefore, the shape, including texture information, of the vertebra may be compared to that of a universe of normal and pathological vertebrae. Likewise, changes in shape parameters at different time points in a longitudinal study may be used as a novel measurement of disease progression.

At step 118, the operator may interact with the annotations and correct them as necessary to make sure that the vertebrae contours match his or her perception of where they should be. In order to do this, the user may choose to interact with a particular match of the model to the target vertebra and initialize a new analysis by moving a number of landmark points or contours joining the landmarks and allowing the model to run for a limited number of iterations. This may be repeated multiple times in an interactive way until the operator is satisfied with the result.

In step 120, the final deformed model that has been matched to the input target vertebra is turned into a vector $x_i$ of 95×2=190 dimensions as per Equation (1). This may be used to derive a parameterization of shape of either a single vertebral body or a set of vertebral bodies. Such parameterization may be carried out by means of the trained shape model. The sample shapes of the training set can be represented by a matrix X'. The shape model is some function, F, which generates a vector of parameters, b, given a set of input point coordinates as Equation (7):

$$b = F(X')$$

In an implementation where the model consists of an "average" shape for the 2D data along with a set of mathematical functions which describe how the shapes can change, b is calculated using Equation (8):

$$b = A(X' - X'_m)$$

where $X'_m$ is the vector of 2D point coordinates (i.e., landmarks) for the "average" shape and A is a matrix learned during the training phase using, for example, Principal Components Analysis, as described in "Principal Component Analysis" as described by Johnson and Wichern, in *Applied Multivariate Statistical Analysis*, pp. 458-513 (5th Edition, 2002), which is incorporated herein by reference. The parameter vector $b_i$ of a transformed shape instance $x_i'$ is now found by Equation (9):

$$b_i = A(x_i' - x'_m)$$

This parameterization may then be used as the input to a multi-dimensional classifier for the classification of prevalent fracture based upon shape (step 122). Likewise, the input to a multi-dimensional classifier can be used to predict fracture/non-fracture outcome of an individual vertebral body over a 5 year time-period. Further still, in addition to the parameters determined from the shape of the model that was fit to the target image, the final positions of the 95 landmarks points of any one or more vertebral bodies in an image for a single subject are used as a shape vector as input to a multi-dimensional classifier used to predict fracture/non-fracture outcome of any vertebral body over a 5 year time-period. Various classification results, for example, from individual vertebrae, may also be combined to provide a combined probability score, as taught in UK Patent Application No. GB 20039821A, filed Apr. 30, 2003 and published Dec. 8, 2004, incorporated by reference herein.

Moreover, one or more measures indicative of vertebral fractures caused by osteoporosis can be derived. The automated annotation that has been described herein is used, in accordance with preferred embodiments of the invention, to extract a number of measurements from the radiograph. For example, derived measurements might include some or all of: six point morphometry; vertebral shape described based on 95 point annotation; vertebral heights and height ratios based upon 6 point morphometry; inter-vertebral space measurements; kyphosis angle measurement; kyphosis irregularity measurement; among others. In addition, derived vertebral deformity classifications may be made based on these geometric measurements. For example, classification of prevalent fracture, classified into fracture categories of mild, moderate or severe, and wedge, biconcave or crush, according to Genant and described in *Bone Miner Res*. September 1993; 8(9):1137-48.

Likewise, as mentioned above, changes in the vertebrae of a single subject over time can be mapped and compared. Thus, these techniques can also be used to evaluate the effects of a medical intervention. Such medical interventions can include, for example, administration of medicinal agents, surgery, or other interventions.

The techniques and systems disclosed herein may be implemented as a computer program product for use with a computer system. Such implementations may include a series of computer instructions, or logic, fixed either on a tangible medium, such as a computer readable medium (e.g., a diskette, CD-ROM, ROM, flash memory or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., microwave, infrared or other transmission techniques). The series of computer instructions embodies all or part of the functionality described herein with respect to the system. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Figure 6:
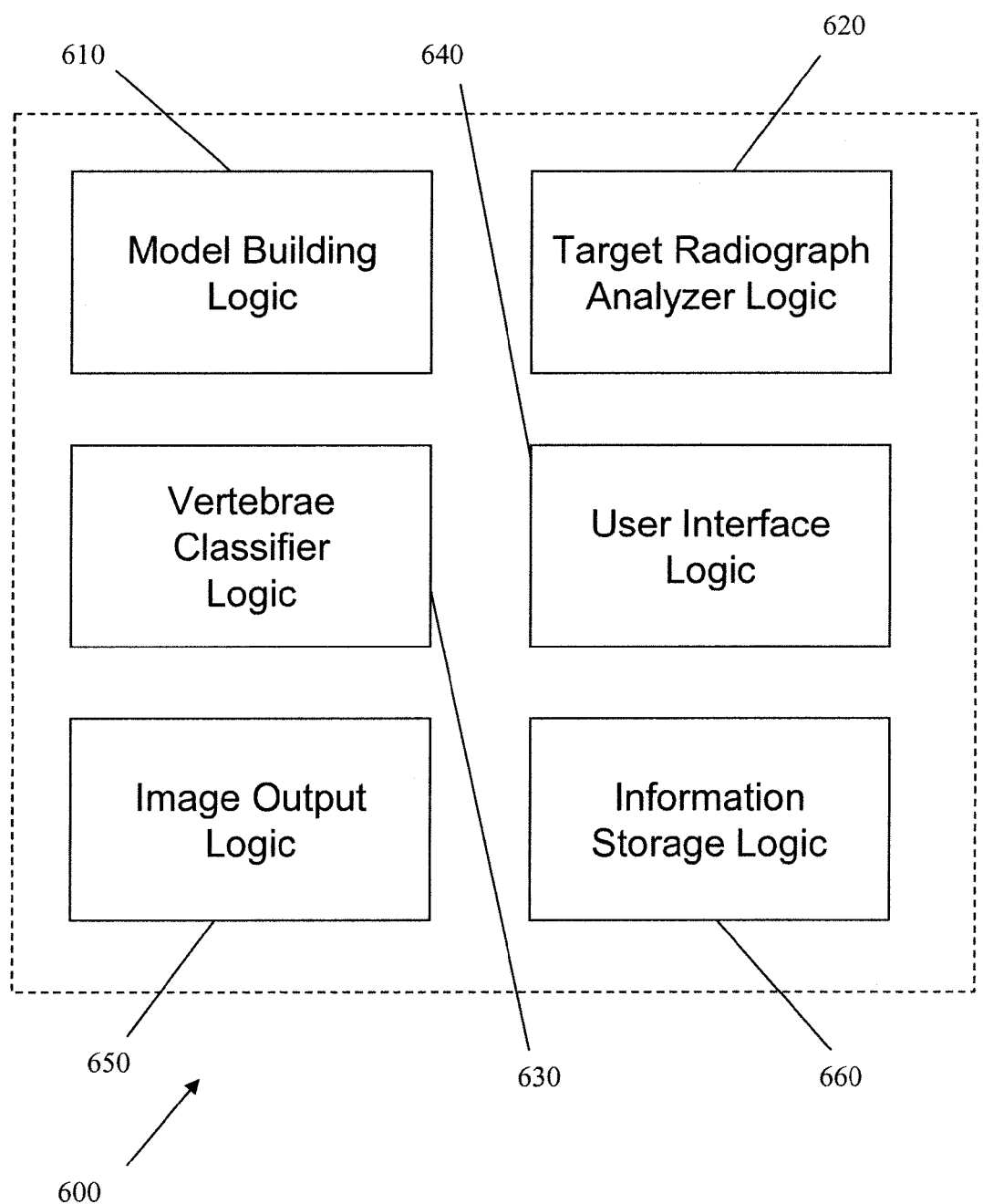
FIG. 6 is an overview of a system for analyzing vertebral radiographs.

FIG. 6 is an overview of a system 600 for analyzing and classifying vertebral radiographs in accordance with the techniques described herein. System 600 has model building logic 610, target radiograph analyzer logic 620, vertebrae classifier logic 630, user interface logic 640, image output logic 650, and information storage logic 660. The model building logic 610 builds and trains the statistical deformable model based on a set of normal and pathological vertebral radiographs. The target radiograph analyzer logic 620 determines landmarks and contours appropriate for a given target image of a vertebra, fits the deformable model to the target image, and determines parameters that characterize the shape and features of the target vertebra. The vertebrae classifier logic 630 determines various metrics associated with the target vertebra to classify degree of fracture, likelihood of future vertebral fracture, likelihood of a diagnosis of osteoporosis, and/or any of the other classification measures or techniques described herein.

The user interface logic 640 enables the user to interact with the system 600 to direct the various steps of the vertebral analysis, including, for example, selection of the target radiograph, indication the of center points in the vertebral image, modification of the model fit to the radiograph image, and other operator tasks. The image output logic 650 cooperates with display hardware to display image information about the progress of the analysis process, the radiograph, the model fit, the parameterization of the vertebra, and classification measure, if any. Information storage logic 660 cooperates with information storage hardware to load and/or save information associated with the radiographs, model fits, parameterization, classification, and/or any other information needed or generated during the analysis process.

Any or all of the logic elements can be executed on a desktop, laptop, and/or mainframe computer system. In addition, portions of the system can be co-located with the equipment that generates the images to be analyzed, or portions can be located remote from the imaging equipment. For example, portions of system 600 can be included in the same computer system that controls the image acquisition hardware. In such an implementation, portions of the system can be transmitted over such networks as those described above, or the images can be transmitted to the system implementing the analysis. Physical images can also be delivered to the location of the analysis system for scanning into system 600. Results from the analysis can be distributed in the same manner, i.e., via a computer network or by physical means. In this way, a central facility can analyze images from many scanning sources and return the analysis to the facility supplying the images.

Figure 7A:
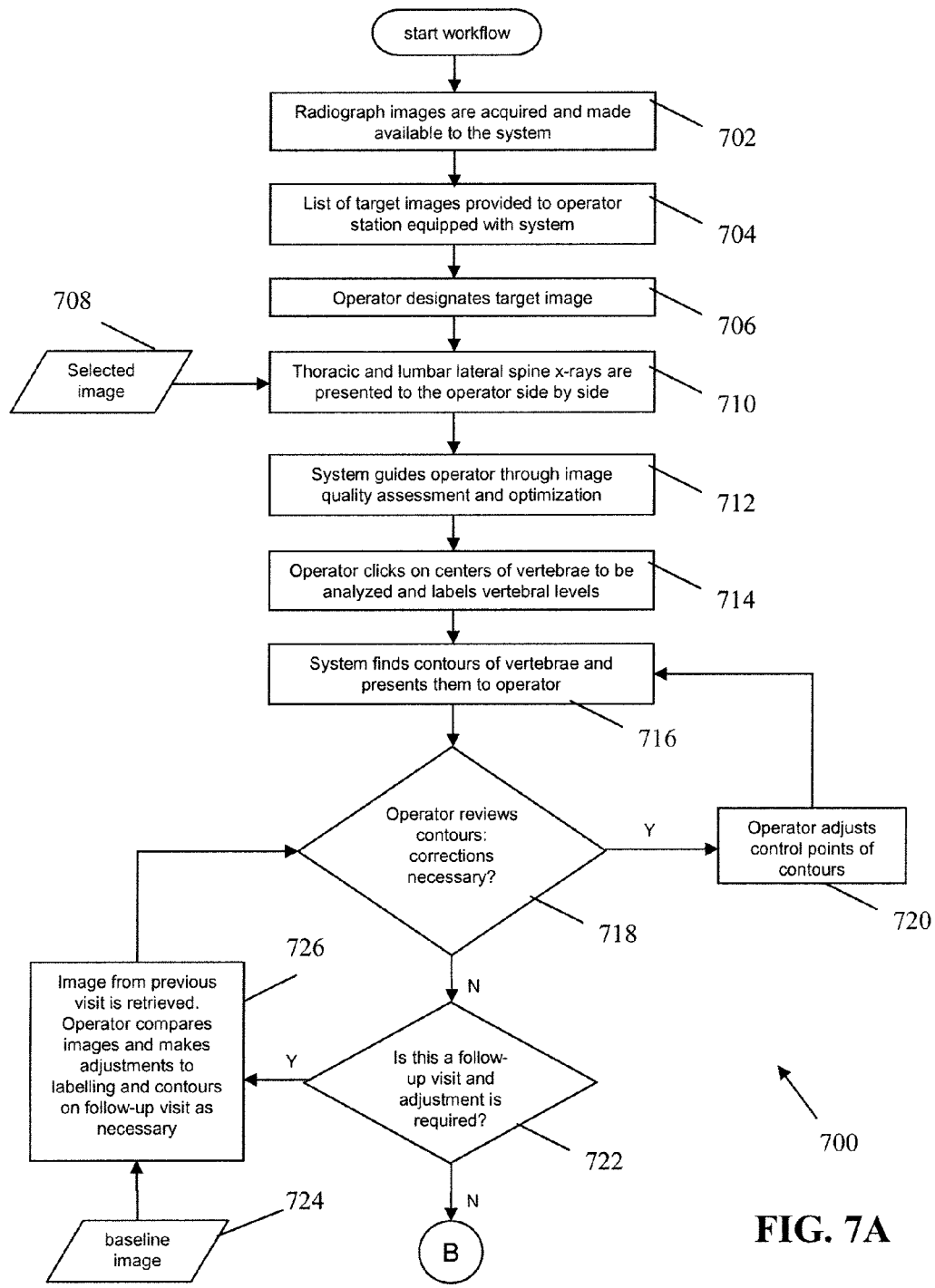
FIGS. 7A-B is a flowchart of an interaction between a system for analyzing vertebral radiographs and an operator using the same.
Figure 7B:
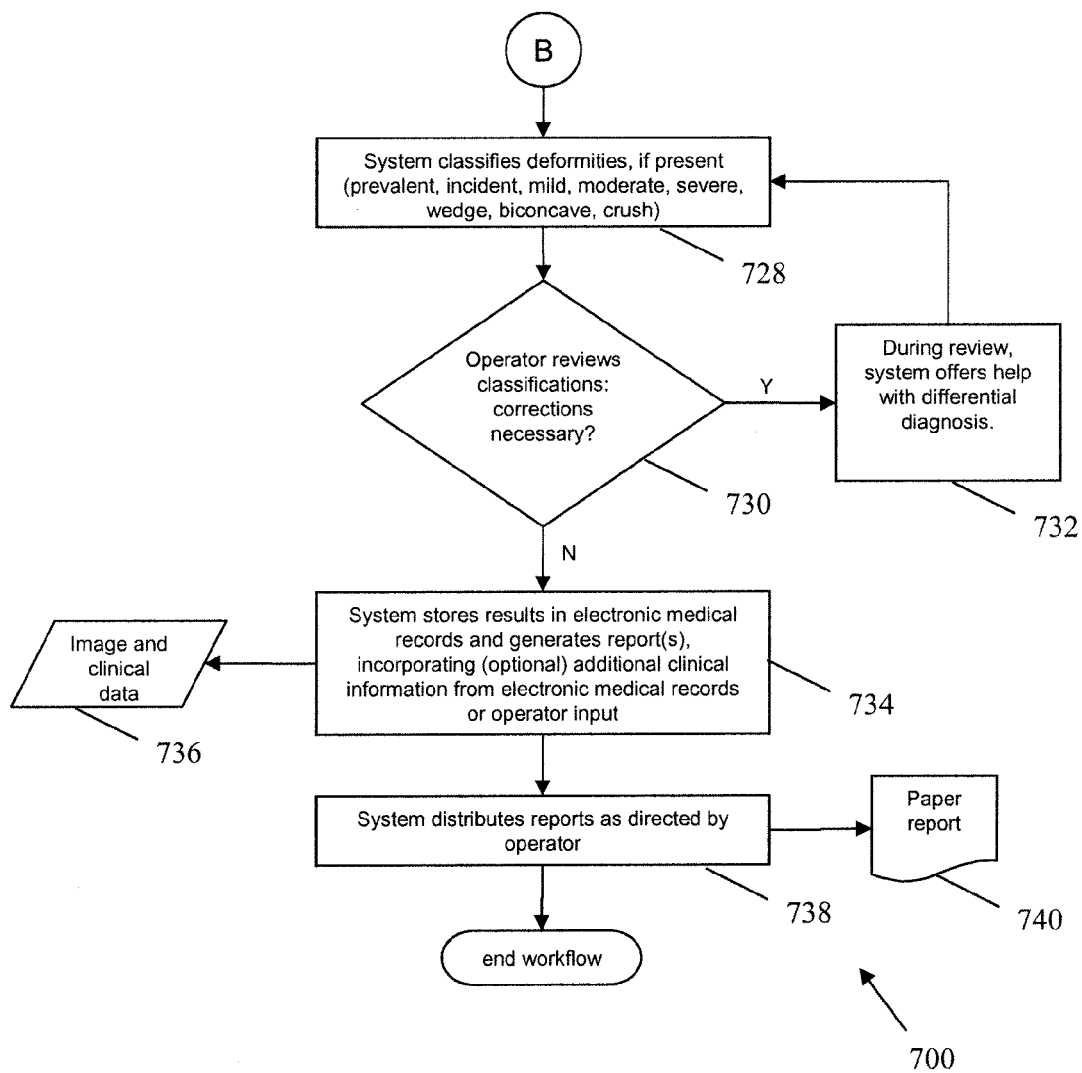

FIGS. 7A-B is a flowchart 700 of an interaction between a system for analyzing vertebral radiographs and an operator using the same. In FIG. 7A, the operator is presented with a collection of images to analyze, and the operator designates the desired target image (steps 702, 704, and 706). In response, the system retrieves the selected image 708 and presents the thoracic and lumbar later spine images to the operator (step 710). The system guides the operator through image quality assessment and optimization, and the operator designates the center of each vertebrae in the image and each vertebra's corresponding level (steps 712 and 714. Next, the system finds the contours of the vertebrae and presents them to the operator (step 716). The operator evaluates the contours for corrections (step 718) and adjusts control points (i.e., landmarks) of the contour is necessary (step 720). The system then repeats the contour match until the operator is satisfied with the match.

The operator determines if the target image is from a follow-up visit (step 722). If so, the operator can review previous images (such as a baseline image 724) to modify the contours determined by the system (step 726). If it is not a follow-up visit, or if the operator is satisfied with the contour match, the system classifies any deformities present (step 728). At this time, the operator can elect to make corrections to the classifications, as guided by the system (step 730 and 732). Upon completion of the classification, the system generates the appropriate reports, stores the reports, the analysis results, and other data in a image and clinical data storage medium 736 (step 734). The system then distributes the reports as directed by the operator, such as by a printed report 740 (steps 738).

Embodiments of the present invention facilitate the rapid, accurate and precise analysis of lateral vertebral x-ray and dual energy x-ray absorptiometry (DXA) images. For example, depending on the specific implementation, all the vertebral labels from T4 to L4 may be annotated, measured, and analyzed in less time than consumed during a manual annotation. In clinical trials, the FDA defines a fracture as a reduction in height of 20% and more than 3 mm. Implementations of the techniques described herein can achieve errors (SD) of point placement, measured as point-to-curve distance of approximately 0.9 mm. In terms of precision, the intra-operator reproducibility of 6 point morphometry using known techniques is between 3-6% in osteoporotic patients. Systems implementing the method disclosed herein have achieved 3%.

Other advantages of the techniques presented herein include widespread availability, cost effectiveness, reduction of harmful side effects, ease of use, and rapid generation of results. Creation of a permanent record that can be easily randomized and blinded is also desirable and achieved. Yet another characteristic of the disclosed methods for tracking the progression of osteoporosis is its correlation with clinical disease course, which can often fluctuate.

Because of the importance of radiographic monitoring for determining long term outcomes, the standardized, systematic method to evaluate and quantify the amount and progression of vertebral deformity caused by osteoporotic fracture presented herein achieves benefits over currently known techniques. The quantitative approach to characterizing vertebral fracture and fracture progression offers several advantages over a method or system that relies on a qualitative evaluation using evaluation scores, such as "better," "the same," or "worse." Data have shown that quantitative, systematic approaches to evaluating the status of osteoporosis induced vertebral fracture can result in a high inter- and intra-observer correlations and earlier characterization of the progression of the disease. The described methods also allow population means to be created and the population created as such, in turn, enables more accurate comparisons between different groups, and possibly even across different studies.

The known SQ method discussed above has several limitations. In cases of subtle deformities, such as mild wedge-like deformities in the mid-thoracic region and bowed endplates in the lumbar region, the distinction between borderline deformity (grade 0.5) and definite mild (grade 1) fractures can be difficult and sometimes arbitrary. Accurate diagnosis of prevalent fractures, which requires assessment of normal variations and degenerative changes and distinguishing them from true fractures, still depends on the experience of the observer. Another limitation of visual SQ assessment is the relatively poor reproducibility in distinguishing the three different grades of vertebral fractures.

Similarly, the widely used six-point placement techniques are unable to capture subtle shape differences; suffer from variability in point placement and are laborious, typically taking 5-15 minutes for the assessment of all the vertebral labels between T4 and L4. Meanwhile, some computer-implemented six-point placement techniques have been found to have worse reproducibility than that with the manual placement technique and/or suffer from other limitations.

As described throughout the disclosure, the methods, systems, and techniques presented herein overcome the limitations and drawbacks of the known techniques. It will be appreciated that the scope of the present invention is not limited to the above-described embodiments, but encompasses modifications of and improvements to what has been described. For example, embodiments have been described in terms of analyzing lateral radiographs of the spine. However, embodiments of the invention can be implemented using CT images or magnetic resonance images (MRI) of the spine. Assessment of osteoporotic fractures in the spine, for example, is most commonly done on slice images of the spine in the sagittal plane. All such variations and modifications are intended to be within the scope of the present invention.

What is claimed is:

1. A method of automatically characterizing a digitized image of a lateral view of a target vertebra, the target vertebra having a superior and an inferior cortical endplate, and the image of the target vertebra including lateral outlines of the cortical endplates, the method comprising:

during a model building phase, building a computer model from a set of sample lateral images of pathological and non-pathological variations of vertebrae, the computer model including a set of parameters to represent variations in shape of the vertebrae;

during a runtime phase, receiving a digitized image of a lateral view of at least one target vertebra of a subject;

during the runtime phase, automatically estimating contours of the lateral outlines of the superior and the inferior cortical endplates of the at least one target vertebra of the image;

during the runtime phase, varying at least one of the parameters of the computer model to determine a set of model parameters that represents a model shape that approximates at least the estimated contours of the lateral outlines of the cortical endplates of the image;

during the runtime phase, automatically characterizing the target vertebra based on the set of model parameters that represents the model shape that approximates at least the estimated contours of the lateral outlines of the cortical endplates of the image; and outputting on a display device the characterization of the target vertebra.

2. The method of claim 1, wherein the characterizing the target vertebra based on the set of model parameters includes a relative comparison of more than one parameter of the set.

3. The method of claim 1, further comprising, automatically determining if at least one of a depression of the cortical endplate and fracture of the cortical endplate is present in the digitized image of the lateral view of the target vertebra based on the set of model parameters that represents the model shape that approximates at least the estimated contours of the lateral outlines of the cortical endplates of the image.

4. The method of claim 1, further comprising:
displaying a visual representation of the model shape that approximates at least the estimated contours of the lateral outlines of the cortical endplates of the image;
receiving input to modify the displayed model shape; and
modifying the set of parameters to represent the modified model shape;
wherein the automatically characterizing the target vertebra is based on the modified set of model parameters.

5. The method of claim 1, wherein the set of parameters of the computer model to represent variations in shape of the vertebrae include information that represents mean spatial locations for features of the sample set of pathological and non-pathological variations of vertebrae, and the set of parameters including measures of amounts that the features can vary from the mean spatial locations.

6. The method of claim 1, wherein the varying at least one of the parameters of the computer model to determine the set of model parameters that represents the model shape that approximates at least the estimated contours of the lateral outlines of the cortical endplates of the image includes:
sampling a set of image data from locations on the image of the target vertebra that correspond to locations along an instance of a shape of the computer model;
estimating a fit between the image of the target vertebra and the instance of the shape of the computer model based on the set of image data; and
iteratively varying the at least one parameter of the computer model, sampling the set of image data from locations on the image of the target vertebra that correspond to locations along the varied instance of the shape of the computer model, and estimating the fit between the image of the target vertebra and the varied instance of the shape of the computer model based on the set of image data from the image of the target vertebra until the difference between the fit of successive instances of the shapes of computer model and the image meets a predetermined criteria.

7. The method of claim 6, wherein the predetermined criteria is met when the fit of successive instances of the shapes of computer model and the image show no improvement in fit.

8. The method of claim 6, wherein the predetermined criteria is met when a predetermined number of iterations has occurred.

9. The method of claim 1, wherein the digitized image includes more than one vertebra of the subject.

10. The method of claim 9, further comprising receiving an identification of which of the more than one vertebra are target vertebrae.

11. The method of claim 1, wherein the digitized image is one of an x-ray image, a magnetic resonance image, and a computed tomography image.

12. The method of claim 1, wherein the at least one target vertebra is at least one of a T4 to an L4 vertebra of a mammalian spine.

13. The method of claim 1, wherein at least 50% of the set of sample lateral images of pathological and non-pathological variations of vertebrae are pathological variations.

14. The method of claim 1, wherein the automatically characterizing the target vertebra based on the set of model parameters includes at least one of six-point morphometry, vertebral shape, vertebral heights, vertebral height ratios, inter-vertebral space measurements, kyphosis angle measurement, and kyphosis irregularity measurement.

15. A method of automatically characterizing a digitized image of a lateral view of a target vertebra, the target vertebra having at least one of double posterior margins, double endplate margins, an anterior margin, osteophytes on an inferior portion of an anterior margin, and osteophytes on a superior portion of an anterior margin, the method comprising:
during a model building phase, building a computer model from a set of sample lateral images of pathological and non-pathological variations of vertebrae, the computer model including a set of parameters to represent variations in shape of the vertebrae;
during a runtime phase, receiving a digitized image of a lateral view of at least one target vertebra of a subject;
during the runtime phase, automatically estimating at least one of contours of the double posterior margins, contours of the double endplate margins, contours of the anterior margin, contours of osteophytes on the inferior portion of an anterior margin, and contours of osteophytes on the superior portion of an anterior margin of the at least one target vertebra of the image;
during the runtime phase, varying at least one of the parameters of the computer model to determine a set of model parameters that represents a model shape that approximates at least one of the contours of the double posterior margins, the contours of the double endplate margins, the contours of the anterior margin, the contours of osteophytes on the inferior portion of an anterior margin, and the contours of osteophytes on the superior portion of an anterior margin of the image; and
during the runtime phase, automatically characterizing the target vertebra based on the set of model parameters that represents the model shape that approximates at least one of the contours of the double posterior margins, the contours of the double endplate margins, the contours of the anterior margin, the contours of osteophytes on the inferior portion of the anterior margin, and the contours of osteophytes on the superior portion of the anterior margin of the image; and
outputting on a display device the characterization of the target vertebra.

16. The method of claim 15, wherein the characterizing the target vertebra based on the set of model parameters includes a relative comparison of more than one parameter of the set.

17. The method of claim 15, further comprising:
displaying a visual representation of the model shape that approximates at least one of the contours of the double posterior margins, the contours of the double endplate margins, the contours of the anterior margin, the contours of osteophytes on the inferior portion of the anterior margin, and the contours of osteophytes on the superior portion of the anterior margin of the image; and
receiving input to modify the displayed model shape; and modifying the set of parameters to represent the modified model shape;
wherein the automatically characterizing the target vertebra is based on the modified set of model parameters.

18. The method of claim 15, wherein the set of parameters of the computer model to represent variations in shape of the vertebrae include information that represents mean spatial locations for features of the sample set of pathological and non-pathological variations of vertebrae, and the set of parameters including measures of amounts that the features can vary from the mean spatial locations.

19. The method of claim 15, wherein the varying at least one of the parameters of the computer model to determine the set of model parameters that represents the model shape that approximates at least one of the contours of the double posterior margins, the contours of the double endplate margins, the contours of the anterior margin, the contours of osteophytes on the inferior portion of the anterior margin, and the contours of osteophytes on the superior portion of the anterior margin of the image includes:
sampling a set of image data from locations on the image of the target vertebra that correspond to locations along an instance of a shape of the computer model;
estimating a fit between the image of the target vertebra and the instance of the shape of the computer model based on the set of image data; and
iteratively varying the at least one parameter of the computer model, sampling the set of image data from locations on the image of the target vertebra that correspond to locations along the varied instance of the shape of the computer model, and estimating the fit between the image of the target vertebra and the varied instance of the shape of the computer model based on the set of image data from the image of the target vertebra until the difference between the fit of successive instances of the shapes of computer model and the image meets a predetermined criteria.

20. The method of claim 19, wherein the predetermined criteria is met when the fit of successive instances of the shapes of computer model and the image show no improvement in fit.

21. The method of claim 19, wherein the predetermined criteria is met when a predetermined number of iterations has occurred.

22. The method of claim 15, wherein the digitized image includes more than one vertebra of the subject.

23. The method of claim 22, further comprising receiving an identification of which of the more than one vertebra are target vertebrae.

24. The method of claim 15, wherein the digitized image is one of an x-ray image, a magnetic resonance image, and a computed tomography image.

25. The method of claim 15, wherein the at least one target vertebra is at least one of a T4 to an L4 vertebra of a mammalian spine.

26. The method of claim 15, wherein at least 50% of the set of sample lateral images of pathological and non-pathological variations of vertebrae are pathological variations.

* * * * *